(12) United States Patent
Hey et al.

(10) Patent No.: US 6,287,999 B1
(45) Date of Patent: Sep. 11, 2001

(54) CASTABLE REFRACTORY COMPOSITIONS

(75) Inventors: Alan Hey; David Michael Pickard, both of Sheffield (GB)

(73) Assignee: Vesuvius Crucible Company, Wilmington, DE (US)

( * ) Notice: Subject to any disclaimer, the term of this patent is extended or adjusted under 35 U.S.C. 154(b) by 0 days.

(21) Appl. No.: 09/424,017
(22) PCT Filed: May 18, 1998
(86) PCT No.: PCT/GB98/01303
  § 371 Date: Feb. 22, 2000
  § 102(e) Date: Feb. 22, 2000
(87) PCT Pub. No.: WO98/52883
  PCT Pub. Date: Nov. 26, 1998

(30) Foreign Application Priority Data

May 17, 1997 (GB) .................................................... 9709988
Dec. 23, 1997 (GB) .................................................... 9727108

(51) Int. Cl.[7] ............................. C04B 35/66; C04B 40/06
(52) U.S. Cl. .............................. 501/89; 501/94; 501/100; 501/124; 501/116; 501/127; 501/128
(58) Field of Search ............................. 501/94, 100, 124, 501/116, 127, 128, 89

(56) References Cited

U.S. PATENT DOCUMENTS

| | | | |
|---|---|---|---|
| 4,174,226 | * 11/1979 | Fitzpatrick et al. | 501/124 |
| 4,341,561 | * 7/1982 | Britt et al. | 501/85 |
| 4,442,219 | * 4/1984 | TenEyck et al. | 501/124 |
| 4,948,765 | * 8/1990 | Snook | 501/127 |
| 4,981,821 | * 1/1991 | Stendera et al. | 501/94 |
| 4,992,397 | * 2/1991 | Hughes, Jr. | 501/124 |
| 5,494,267 | * 2/1996 | Anderson et al. | 501/103 |
| 5,589,426 | * 12/1996 | Iwasaki et al. | 501/32 |

FOREIGN PATENT DOCUMENTS

0579994 * 1/1994 (EP) .
0752397 * 1/1997 (EP) .

* cited by examiner

Primary Examiner—Karl Group
(74) Attorney, Agent, or Firm—James R. Williams

(57) ABSTRACT

The invention relates to a method of producing refractory compositions and more particularly to a method for producing castable refractory compositions which comprises combining appropriate quantities of bulk particulate refractory aggregates substantially without pre-mixing; separately adding to the aggregate system an appropriate quantity of a pre-blended binder composition; mixing the aggregate system and the pre-blended binder composition in a mixer; and discharging the refractory composition from the mixer.

25 Claims, 3 Drawing Sheets

CASTABLE REFRACTORY COMPOSITIONS

BACKGROUND OF THE INVENTION

1. Field of the Invention

This invention relates to refractory and other compositions, and more particularly to castable refractory compositions comprising particulate refractory aggregates and binder components. Compositions for iso-pressing are also within the ambit of the present invention.

2. Description of Related Art

Castable refractory compositions comprising particulate refractory aggregates and binder components are used in the metallurgical, cement, petrochemical and glass making industries for the production of furnace and ladle linings, launders or runners, pouring nozzles and other heat resisting applications.

Castable refractory compositions are generally produced by their manufacturers at sites remote from the premises of the end-users. In a conventional process for producing a castable refractory composition, raw materials, either in bulk, intermediate bulk containers, or bags on pallets comprising particulate refractory aggregates and binder components, are charged into a mixer, which is normally of around one to two tonnes capacity. With the exception of the pallets, which may be re-used, raw materials packaging is frequently subsequently discarded, especially when small paper or plastic bags are involved. Raw materials packaging is normally disposed of by land-fill or incineration, both of which are expensive processes, the former being subject to state imposed taxes. However, residues of particulate refractory materials in the packaging also lead to waste, and therefore a reduction in this and the volume of redundant packaging which is required to be disposed of would be highly desirable.

The batch of discharged raw materials is normally subjected to a thorough mixing operation in the mixer for 5–20 minutes, depending on the composition, in order to produce a homogeneous composition. The power consumption of the mixer is considerable and adds to the costs of the product. Finally, the composition is discharged from the mixer and re-packaged in 25 Kg, 250 Kg, 500 Kg, 1000 Kg or 2000 Kg bags as required, and after having undergone extensive quality control testing, is transported to the premises of the end-user.

On arrival at the end-user's premises, the various types of bags are broken open, and the contents discharged into a second mixer. The bags may again be discarded, with the attendant disposal problems set out above, and the composition is subjected to further mixing in the second mixer, during which process, water is added to the mixed composition. The castable composition is then discharged from the mixer for conveying, or pumped, to the site where the cast lining is formed in-situ.

It will be apparent from the above description that there are several difficulties inherent in the current method for the manufacture of castable refractory compositions. In addition to the disposal problems represented by the two sets of discarded bags, the entire composition is required to be mixed on two separate occasions, in large mixers having a substantial power consumption.

Having mixed aggregates with binder, it is important that the composition remains dry until the time that it is required. Otherwise the binder can deteriorate preventing homogenous curing of the final mixtures. It is for this reason, primarily, that smaller bags of the composition might frequently be employed, so that if any bag does develop a leak during storage or transportation, permitting ingress of water, only a small amount of the composition is ruined.

However, a completely unrelated issue is that furnaces cost a considerable sum of money to he kept idle while repairs are effected. Furnace operators plan upgrades and repairs to the furnace and related equipment meticulously, so that the time for which the furnace is inoperative may be minimised. One repair is the replacement of the lining of troughs, runners, furnaces and ladle linings etc, and for the refractory supplier, who usually has the responsibility of overseeing the repair, this means little time can be allowed for the item which is to be repaired to cool before the repair must be effected so that the newly cast refractory composition will be cured and hardened before the furnace is switched back on line. Time is therefore of the essence. Furthermore, when casting refractory compositions into still very hot components which have only recently come off line, the cure rate of the composition is inevitably very fast. While this in itself is not a problem, it means that when boundaries exist between one cast and a subsequent cast, lines of weakness at the boundary can develop resulting possibly in cracks or other defects in the refractory lining.

The answer to these problems is to cast in large volumes, very quickly. Thus furnace operators may be provided with a large two-tonne mixer and a number of mobile skips or hoppers of the same capacity so that they may have the mixed composition discharged into the skips one immediately following the other. Thus, perhaps three or four skips might be filled one after the other, so that each may be discharged in rapid succession giving, to all intents and purposes, a continuous delivery. Meanwhile, the mixer is mixing a further batch, which may be ready for emptying into the first (now empty) skip or hopper, before the third skip has been discharged. In this way, perhaps up to sixteen tonnes of refractory may be cast almost at one time.

However, charging, adding water, mixing and discharging mixers is relatively time consuming, and it is this element in the process which is the bottleneck. Eventually the speed of the cycle is reduced to its slowest component and the quasi-continious casting reduced to batch casting. Since it. is the object is to have a continuous cycle of charge, mix and discharge, so that the casting process can be continuous, the mixing process needs to be speeded-up.

This militates against the use of small bags of composition simply because of the time required to empty the bags into the mixer. Thus it is an object of the invention to overcome the aforementioned problems, or at least to mitigate their effects.

SUMMARY OF THE INVENTION

According to the present invention, the above difficulties are obviated by a novel method in which the binder composition is blended in a separate stage before mixing with the particulate refractory materials (hereinafter termed "the aggregate system").

In a first aspect, the present invention provides a method for producing castable refractory compositions which comprises composing an aggregate system of appropriate quantities of bulk particulate refractory aggregates substantially without pre-mixing, separately adding to the aggregate system an appropriate quantity of a pre-blended binder composition, transporting the aggregate system to an installation site, mixing at the installation site the aggregate system and the pre-blended binder composition with water in a mixer and discharging the refractory composition from the mixer.

Such a method produces numerous advantages.

DETAILED DESCRIPTION OF THE INVENTION

Figure 1:
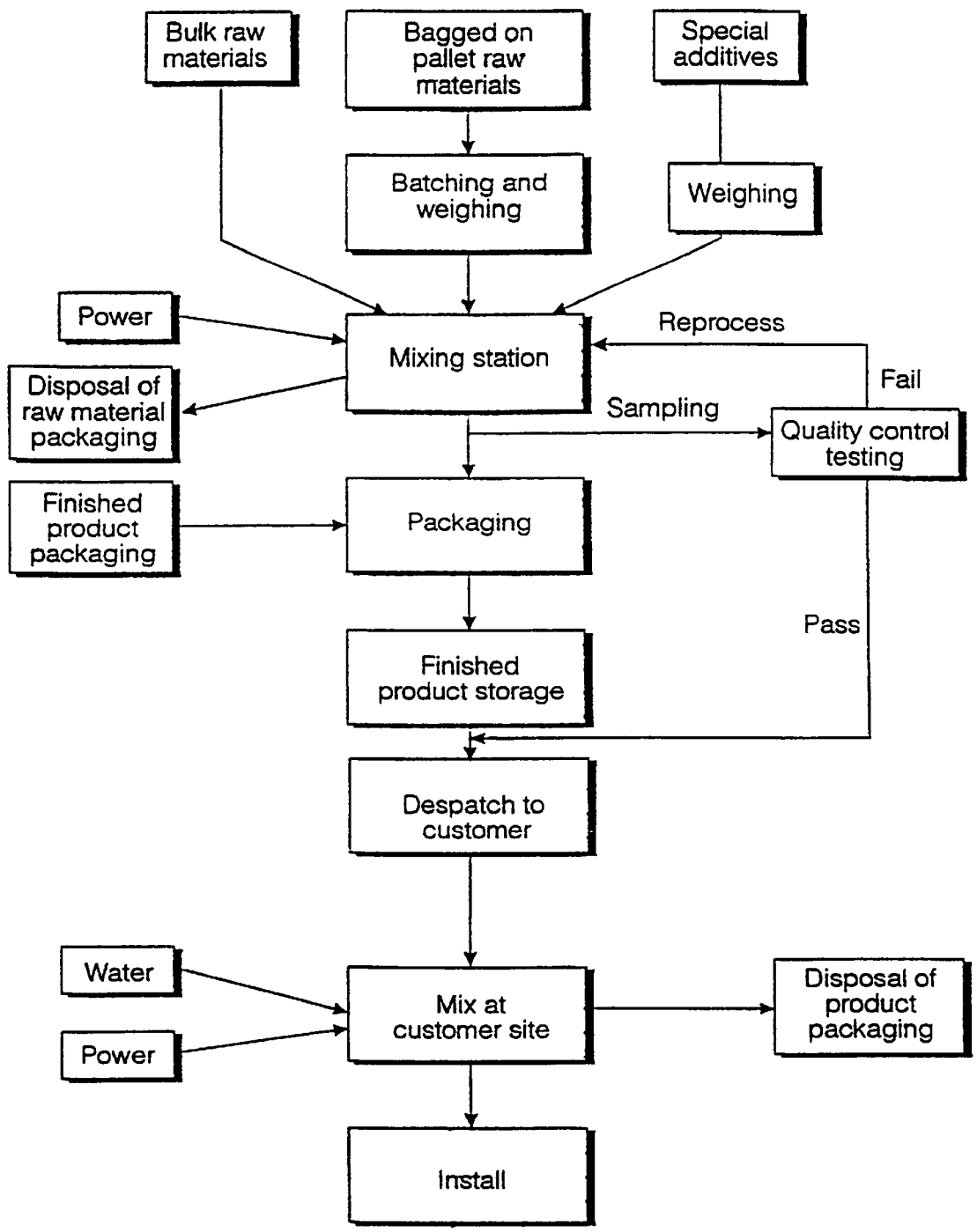
FIG. 1 is a schematic representation of a conventional method for producing castable refractory compositions.

In a preferred embodiment of the invention, the components of the aggregate system are purchased to guaranteed chemical and particle size specification in reusable intermediate bulk containers. The pre-blended binder is preferably added in a weighed amount to the aggregate components, and the combined materials transported to the user site in the intermediate bulk container originally containing one of the aggregate components. This has the advantage of providing at least two re-usable intermediate bulk containers, one containing the material despatched to the user site, and one available for other use.

In this specification the term "castable refractory composition" is defined as a precursor comprising particulate refractory materials, and a binder composition, which, when combined with water in the appropriate proportions preferably in the mixer, can be discharged, transported and cast in-situ to form the desired refractory shape.

The components of the aggregate system comprise refractory aggregates in the appropriate quantities, and generally comprise first and second aggregate components, for example, the first comprising alumina and the second comprising silicon carbide.

The first component, alumina powder, is preferably present in an amount of from 10 to 90% of the total composition by weight, and preferably has a typical particle size range of 100 to 12,500 microns.

The second component, silicon carbide is preferably present in the composition in an amount of from 5 to 90% of the total composition by weight, and preferably has a typical particle size range of 5 to 2000 microns.

In each case, the particle size distribution is controlled to within a specified range.

Other aggregate system components may be used in whole or partial replacement for the alumina and silicon carbide components, but there will always be at least two components. Alternatives may include, for example, andalusite, calcined bauxite, kyanite, sillimanite, chamottes, sintered or fused alumina-spinel, sintered or fused magnesia, zircon and zirconia.

The required particle size distribution of the aggregate components can be achieved, for example, by blending or assembling specific fractions of particulate refractory materials in the desired proportions. This operation is preferably carried out by the aggregate component suppliers who will assemble the correct combination of particles to meet a specific particle size distribution aim, and package them in a specified type and capacity intermediate bulk container.

An important aspect of the present invention is that the component parts of the binder composition are separately blended prior to batching with the aggregate system. The components of the binder composition can comprise, for example, reactive alumina, fine silicon carbide, ultrafine silica powder, clays, high alumina cements and hydrateable alumina.

The binder composition preferably comprises from 5 to 35% of the total refractory composition by weight.

The above proportions of materials refer to dry weight, and do not include the water which is added to produce the final castable refractory composition. The amount of water added can be up to about 10% by weight, but is preferably from 5 to 5.5% by weight, based upon the total dry weight of the composition.

The invention, in preferred embodiments, enables the entire composition to be mixed only once, using a mixer situated at the premises of the end-user. Moreover, it has been found that the required time of mixing is no more than has hitherto been originally required on-site when mixing water with the premixed aggregate and binder composition. In other words, substantial energy savings can be made at the refractory suppliers site by avoiding the mixing there, the saved costs of which can be passed to the final customer.

Another important advantage of the present invention is realised in that premixed aggregate and binder has very poor flow properties, due to the finer particles filling the gaps between larger particles and binding the whole together. This is, of course, very desirable in the final cast product, not when attempts are made to transfer the components from their packaging to the mixer by solid flow.

Thus an important aspect of the present invention provides a package of materials for producing formable refractory products, the materials comprising, in appropriate relative quantities, substantially unmixed layers of at least first and second compositions. Preferably, said product is castable and said first and second compositions comprise aggregate components.

Preferably, said package includes a layer of a preblended binder composition in an appropriate quantity with respect to said aggregate components. Preferably the binder is between said first and second composition layers.

The components are in amounts ready to mix with water to form said castable refractory composition. This arrangement has two particular advantages. Firstly, since there is no substantial mixing between the layers, each layer is discrete and therefore flows relatively easily. This effect is enhanced if the first, and second components are themselves graded into sub-layers. This arrangement enables a fast and complete discharge of the package, leaving it relatively clean for subsequent reuse. Secondly, if the binder is disposed between the two aggregate layers it is protected from the two main sources of moisture ingress, namely, the open top of the package, and the bottom of the package which is susceptible to punctures and to seepage of water lying on the ground. Of course, it does not matter if the aggregates get a little damp, so long as the binder is kept dry. Since it is the binder which is the finest powder, it is usually this that gets left behind sticking to packaging walls etc. However, the aggregate sitting above the binder has the effect of scrubbing the packaging as it leaves the packaging, taking with it substantially all traces of the binder.

A further advantage of this arrangement is the security it provides against deliberate attempts by others to determine the composition of the product being supplied. Precise compositions of aggregate components, and binder compositions, not to mention their total composition in the final product, are sometimes closely held trade secrets. By providing the components in segregated layers in the delivery package, an attempt to discern this information cannot successfully be made by taking only a small sample as a means of establishing the contents of the entire package.

Additionally, the present invention finds application with iso-pressable refractory compositions such as alumina/graphite, which may be formed by isostatic pressing into alumina-graphite pieces: that is to say, wherein said first and second compositions comprise alumina and graphite. The graphite may be disposed in a layer between layers of alumina.

In one preferred embodiment of a castable product, the components of the aggregate system, each having the required particle size distribution, are delivered to the manufacturer in re-usable packaging, which preferably comprises, for example, a mini-bulk sack.

Preferably, the alumina aggregate is delivered in an oversize mini-bulk sack which is of such a size that there is sufficient volume for the silicon carbide and binder composition to be added to the sack. This avoids the use of paper sacks for the components, alleviating the disposal problem, and reducing the loss of components on de-bagging.

Of the composition components discharged into the minibulk sack, only the binder composition will have been subjected to prior blending. The components will, however, have been accurately weighed into the mini-bulk sack, so that they will be present in the specified proportions. The mini-bulk sack, or other suitable container, can then be delivered to the end user.

At the premises of the end-user, the mini-bulk sack is discharged directly into a mixer, and the entire refractory composition mixed for the first and only occasion. Because of the unmixed nature of the components, discharge from the sack is rapid. Water is then added to the mixer and the castable refractory composition discharged and processed in the usual way.

Power consumption is reduced, as mentioned baove, since the binder represents only from 5 to 35% by weight, typically 20%, of the final mix, and this is the only component which is subjected to pre-blending.

A further advantage is that quality control testing of the components can be substantially reduced in the new method, since every tonne of binder will typically produce 5 tonnes of final castable composition. Indeed, this latter point is particularly important because, hitherto, samples of mixed aggregate and binder could only be taken, realistically, one test for each three to six tonnes produced, depending on batch size, (representing 15–33% test rate) so that quality could not he so well assured. With the present method, however, the aggregates are supplied by the aggregate supplier in guaranteed composition having been quality assured separately. The refractory supplier need only be concerned with the binder for which a single batch, comprising typically 10 to 20% by weight of the final composition, will typically be sufficient for, say, six tonnes of final product. Testing of the premixed hinder therefore represents 100% quality assurance.

The method according to the convention also enables reusable packaging to be introduced, thereby reducing the problem of disposal of unwanted packaging materials. Overall, there is less raw material handling and therefore reduced waste/spillage of raw materials. The number of weighing operations can also be reduced and overall batch accuracy can thereby be improved.

Whilst it is usual for the manufacturer to supply the refractory composition to the end-user in bulk re-usable containers ready for mixing, it would be possible for the aggregate system and the blended binder composition to be delivered to the end-user separately and discharged into a mixer at the end-user's premises.

Additionally, the present invention is concerned with iso-pressing compositions such as alumina/graphite, which may be isopressed into alumina-graphite pieces. The advantages of the present invention may likewise be felt with such compositions.

Figure 2:
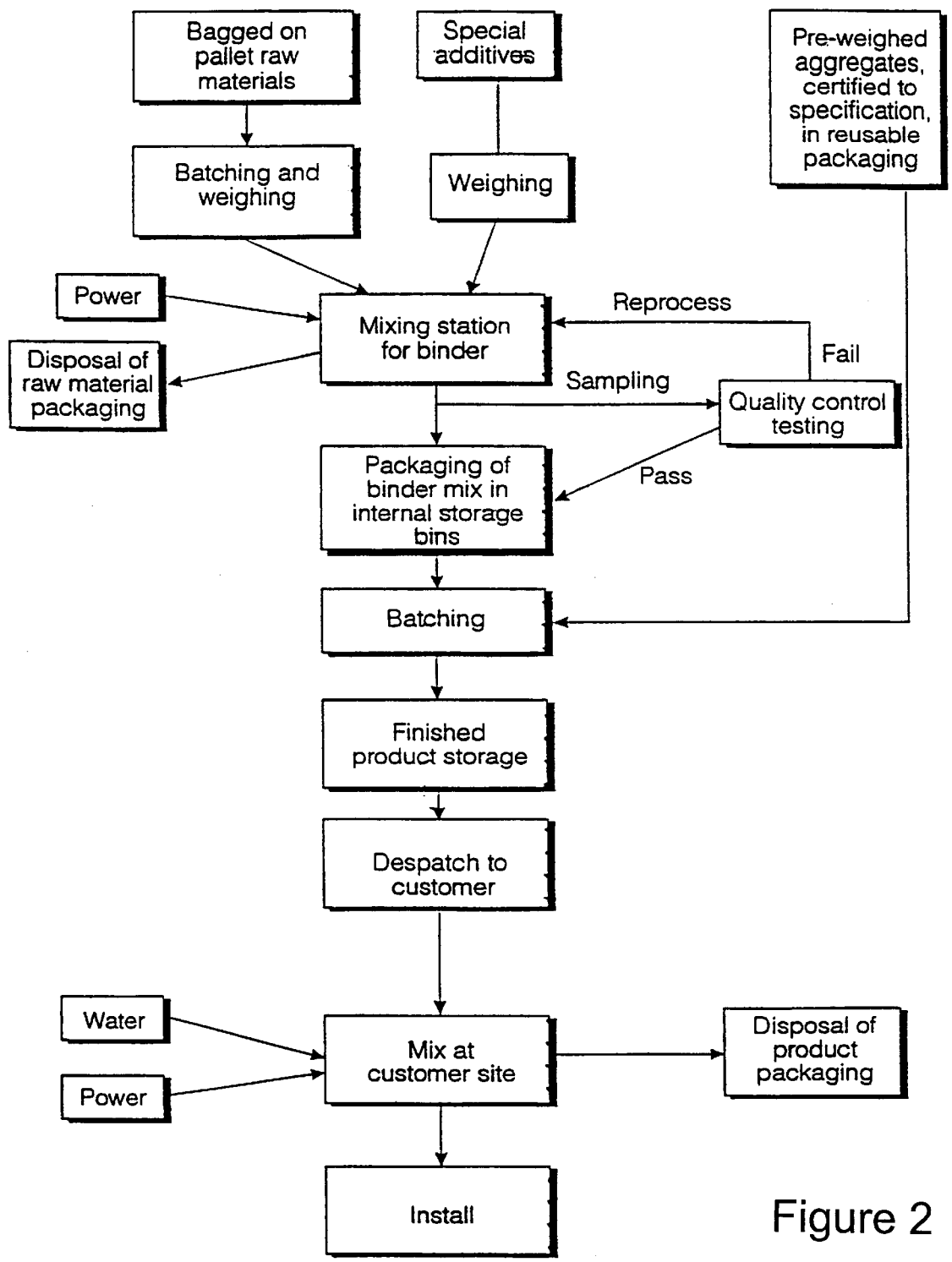
FIG. 2 is a schematic representation of a method for producing castable refractory compositions according to the invention.

A comparison between the conventional processing method and a method in accordance with the invention, is illustrated, by way of example, in the accompanying flow diagrams, in which:

FIG. 1 is a schematic representation of a conventional method for producing castable refractory compositions; and FIG. 2 is a schematic representation of a method for producing castable refractory compositions according to the invention.

In FIGS. 1 and 2, the essential difference between the two processes is the mixing station 12 in FIG. 1 is applied to all materials, whereas the same station 12' in FIG. 2 only relates to blending of the binder. Moreover, there is an additional input 14 in FIG. 2 in which pre-weighed aggregates, certified by their supplier to conform with predetermined specifications, are supplied direct to the batching station 16.

Figure 3:
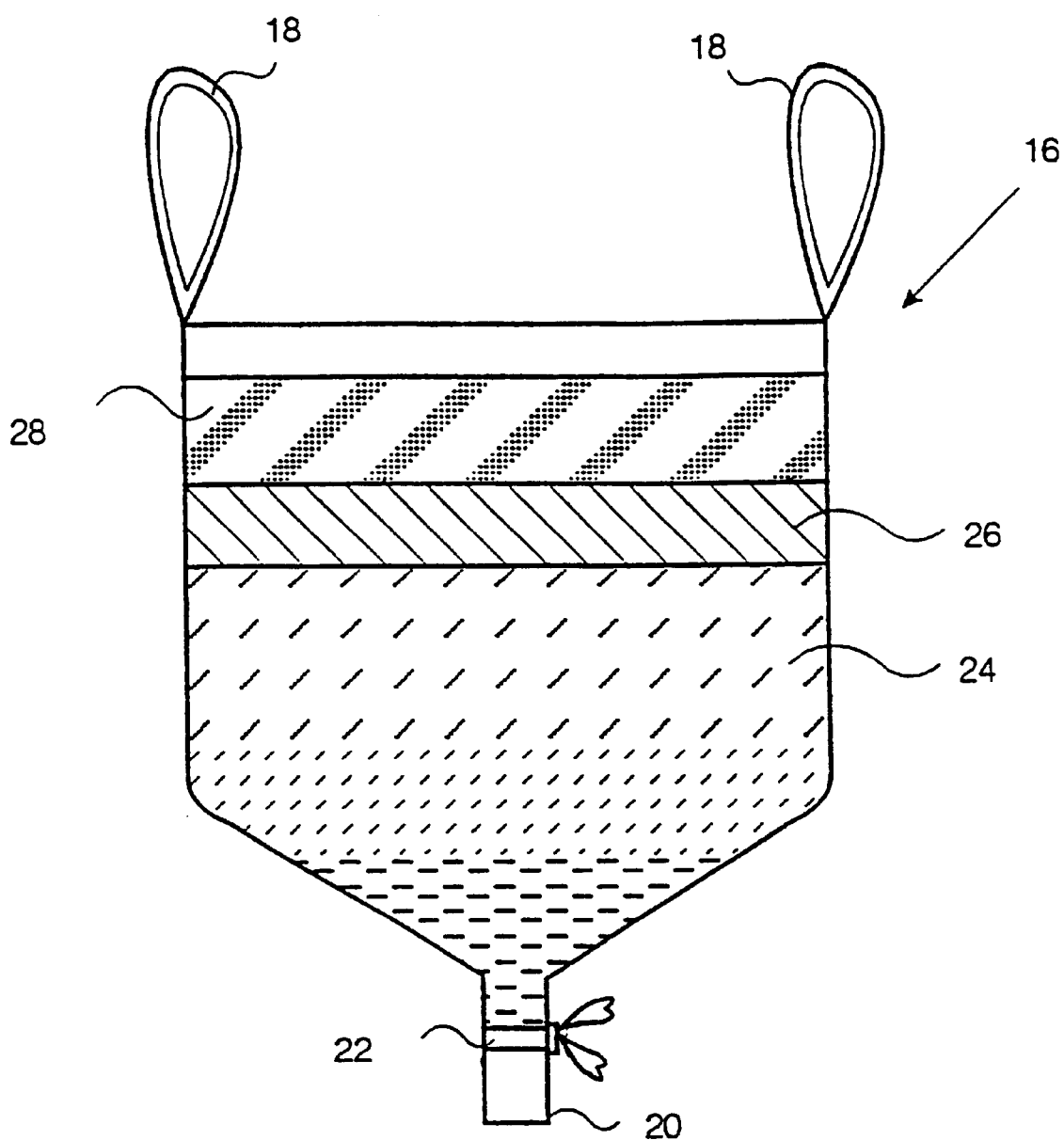
FIG. 3 is a cross-section through a mini-bulk sack showing the layering of materials contained therein.

The invention is further described hereinafter, by way of example, with reference to FIG. 3, in which is a section through a mini-bulk sack showing the layering of the materials contained therein.

In the drawing, a minibulk sack 16 comprises a reinforced fabric bag having carrying handles 18 and discharge opening 20. The opening 20 is controlled by a tie 22. In the bag there are three layers of material: a first layer 24 of a first aggregate component such as alumina; a second layer 26 of a binder composition; and, a third layer 28 of a second aggregate component such as silicon carbide. The binder layer 26 is a pre-blended, homogenous composition, such as described below. However, the aggregate layers 24, 28 may be stratified according to its different components with substantially no intermixing.

In any event, there is little or no intermixing between the three layers, other than marginal mixing and mutual settlement at their respective boundaries. Importantly there is no opportunity for mutual interpacking of the various components, so that smaller particles of the components do not fill and pack the interstices between the larger particles.

An embodiment of the invention will now be illustrated by the following Examples:

EXAMPLE I

This example describes the production of a castable refractory composition by a method in accordance with the invention.

Binder Preparation

The component parts of a binder composition comprising ultrafine alumina powder, silicon carbide powder, high alumina cements, clays and deflocculants are charged into a suitable mixer, capable of producing a large batch. Packaging from the binder ingredients is discarded. On completion of the mixing cycle, the binder composition is discharged from the mixer into suitable containers or packaging which may include re-usable items. At this stage, a sample of the binder composition is taken and blended with the correct proportion of the aggregate system to give a complete mix for quality control testing in the laboratory. The physical properties of the final composition are then determined and compared to the product definition or specification.

Aggregate System Preparation 1.0 tonne of alumina aggregate of average particle size range 12500 to 100 microns is provided in a mini-bulk sack of total capacity 2.0 tonnes. 0.6 tonnes of silicon carbide aggregate of particle size range 2000 to 5 microns is provided in a mini-bulk sack of capacity 1.0 tonne.

Additional aggregate materials, for example, sintered or fused alumina spinel may be added to bring the aggregate system to the desired specification. Alternatively, the sintered or fused alumina-spinel aggregates may wholly or partially replace the alumina component. In any event, the components of each aggregate are added separately so that, in each sack, the aggregates are in sub-layers within the sack.

0.4 tonnes of mixed binder composition are added to the mini-bulk sack containing the alumina aggregate component, followed by the 0.6 tonnes of the silicon carbide aggregate component, to produce a package of layered components. Of course, pouring the sub-layered silicon carbide component into the alumina sack does result in some mixing, but not enough to homogenise that component.

The sack is then sealed for transportation to the end user site of installation.

At the premises of the end-user, the entire contents of the mini-bulk sack are discharged into a mixer of capacity 2 tonnes. By virtue of the layering of the components, discharge takes about 15 seconds, as opposed to about 30 seconds with mixed components. Moreover, the discharge is clean, leaving the sack reusable. The components are mixed for 2 minutes in the mixer while typically 100 litres of water are added, and, after further mixing for about 4 minutes to distribute the water evenly throughout the composition, the castable refractory composition is discharged into appropriate conveying systems for transporting to the area where the castable composition is to be installed.

EXAMPLES A to D

Three further examples (A, B and C) were prepared for comparison with a fourth, conventionally premixed, example (D). All Examples A to D have identical compositions, and each Example A to C was dry mixed for reducing periods of time before being mixed with water.

The following Table of results was achieved:

TABLE

|  | Examples | | | |
| --- | --- | --- | --- | --- |
|  | A | B | C | D |
| Mixing cycle used | | | | |
| Dry mixing(min) | 7.0 | 4.0 | 0.5 | 0.5 |
| Add water(min) | 1.5 | 1.5 | 1.5 | 1.5 |
| Wet mixing(min) | 4.0 | 4.0 | 4.0 | 4.0 |
| TOTAL TIME(min) | 12.5 | 9.5 | 6.0 | 6.0 |
| Physical Properties | | | | |
| Flow value(mm) | 154 | 159 | 157 | 150 |
| Setting time(min) | 160 | 185 | 190 | 180 |
| Dried Properties | | | | |
| Bulk Density(kg m') | 2820 | 2830 | 2840 | 2850 |
| CCS (MN m') | 23.6 | 28.5 | 27.6 | 25.2 |

Example A represents an equivalent mixing time to the conventional Example D, given that example D will have been subjected to pre-mixing for about six minutes at the refractory supplier's premises before delivery to the installation site. Example C, however, shows that reducing the dry mixing stage to no more than was conventionally done, prior to addition of water, has no significant effect on the physical and dried properties of the final product compared with Example D, despite reduced mixing effected.

What is claimed is:

1. A method of producing castable refractory compositions, which method comprises:
   composing an aggregate system of a plurality of bulk particulate refractory aggregates as separate layers within a container;
   separately adding to the aggregate system a pre-blended binder composition as an additional layer within the container;
   transporting the container to an installation site;
   mixing at the installation site the aggregate system and the pre-blended binder composition with water in a mixer; and,
   discharging the refractory composition from the mixer.

2. A method according to claim 1, wherein the container comprises a re-usable bulk container.

3. A method according to claim 2, in which the reusable bulk container is a mini-sack.

4. A method according to claim 1, in which the aggregate system and the pre-blended binder composition are discharged directly into the mixer and mixed therein.

5. A method as claimed in claim 1, in which the plurality of refractory aggregates comprises a first refractory aggregate including alumina and a second refractory aggregate including silicon carbide.

6. A package of materials for producing formable refractory products, which package comprises a container and at least two materials selected from the group consisting of:
   a) a binder composition;
   b) a first aggregate component; and
   c) a second aggregate component,
wherein the materials are in layers in said container.

7. A package as claimed in claim 6, in which said formable refractory product is castable and the materials comprise aggregate components.

8. A package as claimed in claim 7, in which said package includes a layer of pre-blended binder composition, at 5–35 wt. % with respect to said aggregate components.

9. A package as claimed in claim 8, in which the binder is in a layer between layers of aggregate components, whereby said binder is at least partially protected from ingress of moisture into the package from either side of the layers of aggregate components remote from said binder layer.

10. A package as claimed in claim 7, in which the first aggregate component comprises alumina, and the second aggregate component comprises silicon carbide.

11. A package as claimed in claim 7, in which the first aggregate component comprises alumina and the second aggregate component comprises alumina spinel.

12. A package as claimed in claim 7, in which said product is iso-pressable, and the first and second aggregate components are the same.

13. A package as claimed in claim 6, in which said product is iso-pressable, and the first and second aggregate components comprise alumina and graphite.

14. A method according to claim 2 in which the aggregate system comprises first and second components.

15. A method according to claim 3 in which the aggregate system comprises first and second components.

16. A method according to claim 4 in which the aggregate system comprises first and second components.

17. A method according to claim 14, in which said first and second components are alumina and silicon carbide, respectively.

18. A method according to claim 15, in which said first and second components are alumina and silicon carbide, respectively.

19. A method according to claim 16, in which said first and second components are alumina and silicon carbide, respectively.

20. A package as claimed in claim 8, in which the first aggregate component comprises alumina, and the second aggregate component comprises silicon carbide.

21. A package as claimed in claim 9, in which the first aggregate component comprises alumina, and the second aggregate component comprises silicon carbide.

22. A package as claimed in claim 8, in which the first aggregate component comprises alumina, and the second aggregate component comprises alumina spinel.

23. A package as claimed in claim 9, in which the first aggregate component comprises alumina, and the second aggregate component comprises alumina spiner.

24. A package as claimed in claim 8, in which the first and second aggregate components are the same.

25. A package as claimed in claim 9, in which the first and second aggregate components are the same.

* * * * *